US009615171B1

(12) United States Patent
O'Neill et al.

(10) Patent No.: US 9,615,171 B1
(45) Date of Patent: Apr. 4, 2017

(54) TRANSFORMATION INVERSION TO REDUCE THE EFFECT OF ROOM ACOUSTICS

(75) Inventors: Jeffrey C. O'Neill, Somerville, MA (US); Stan W. Salvador, Tega Cay, SC (US)

(73) Assignee: Amazon Technologies, Inc., Seattle, WA (US)

( * ) Notice: Subject to any disclaimer, the term of this patent is extended or adjusted under 35 U.S.C. 154(b) by 1230 days.

(21) Appl. No.: 13/540,435

(22) Filed: Jul. 2, 2012

(51) Int. Cl.

| | |
|---|---|
| ***G10L 19/02*** | (2013.01) |
| ***H04R 1/02*** | (2006.01) |
| ***H04B 15/00*** | (2006.01) |
| ***H04R 3/00*** | (2006.01) |

(52) U.S. Cl.
CPC .................................... *H04R 3/005* (2013.01)

(58) Field of Classification Search
CPC ...................................................... H04R 3/005
USPC .......................................................... 704/203
See application file for complete search history.

(56) References Cited

U.S. PATENT DOCUMENTS

| | | | | |
|---|---|---|---|---|
| 7,103,187 | B1 * | 9/2006 | Neuman | 381/59 |
| 2003/0147538 | A1 * | 8/2003 | Elko | 381/92 |
| 2007/0253574 | A1 * | 11/2007 | Soulodre | 381/94.2 |
| 2010/0188929 | A1 * | 7/2010 | Kitaura | G06F 1/1605 367/13 |
| 2012/0114130 | A1 * | 5/2012 | Lovitt | 381/73.1 |
| 2012/0140936 | A1 * | 6/2012 | Bonnick et al. | 381/59 |
| 2012/0269356 | A1 * | 10/2012 | Sheerin et al. | 381/58 |
| 2012/0288124 | A1 * | 11/2012 | Fejzo et al. | 381/303 |
| 2014/0337016 | A1 * | 11/2014 | Herbig et al. | 704/201 |

* cited by examiner

*Primary Examiner* — David Hudspeth
*Assistant Examiner* — Timothy Nguyen
(74) *Attorney, Agent, or Firm* — Knobbe, Martens, Olson & Bear, LLP

(57) ABSTRACT

Embodiments of systems and methods are described for inverting transformations of signals due to room acoustics. In some implementations, a transformation of a calibration signal from a particular location in a room may be determined. From this transformation, an inverse transformation may be determined and the inverse transformation may be applied to a speech signal received from a similar location.

19 Claims, 11 Drawing Sheets

TRANSFORMATION INVERSION TO REDUCE THE EFFECT OF ROOM ACOUSTICS

BACKGROUND

Hands-free audio interactions between users and various applications and computing devices have been increasing. Speech recognition techniques have been developed to allow users to perform various computing tasks, including controlling various devices, using speech as a data input to replace various other types of input devices such as keyboards, mice, remote controls, etc. However, users wish to be unencumbered from having to hold or position themselves very close to microphones capable of detecting their spoken instructions.

Existing speech recognition techniques have generally been developed for speech input from a near-field source. For example, current techniques typically require that a microphone is placed relatively close to a user's mouth (e.g., speaking into a hand-held device, portable computing device, cell phone, headset, etc.). When speech is provided from a far-field, such as when a microphone is placed across a room from the user, the effects of room acoustics may transform or distort the speech, rendering it unusable by a speech processor.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
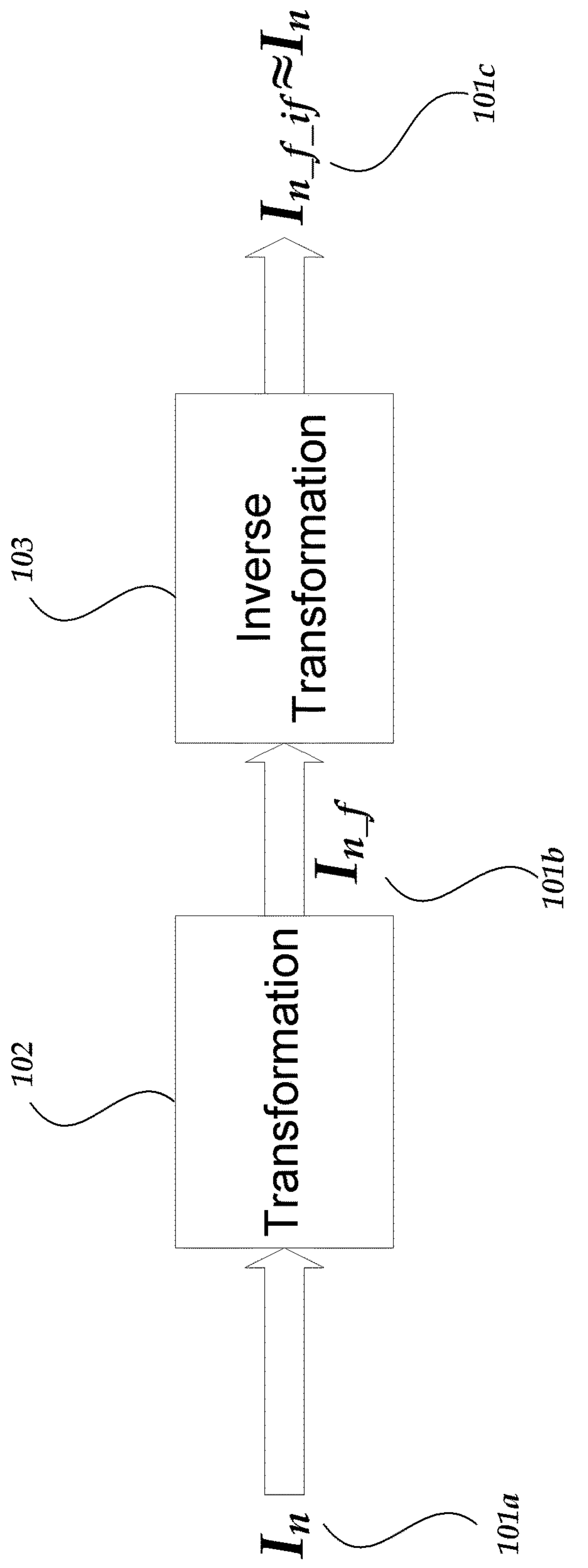
FIG. 1A is a block diagram schematically illustrating an example of effects of a transformation and inverse transformation on a signal input.

Embodiments of systems, devices and methods suitable for far-field voice recognitions are described herein. Such techniques include an initial calibration mode and a subsequent speech recognition mode. During initial calibration, one or more acoustic interfaces (each having a microphone) identify and quantify a transformation, such as for example an acoustic distortion, related to various positions within an acoustic space (e.g., a living room, a car, an office, etc.). In various embodiments, the systems, devices and methods determine the transformation in relation to a device positioned at a known location with respect to the acoustic interface within the acoustic space. Once positioned, the device generates a calibration signal. The transformed calibration signal may be measured by the acoustic interface and the measured signal may be compared to the untransformed calibration signal. The measurement and comparison of the signals may be performed by a processor located on the acoustic interface positioned within the acoustic space, or may also be performed by a processor positioned on a device or server located outside the acoustic space, including for example located on a network connected to the acoustic interface. The processor may also include an application which may be installed on home media equipment within the acoustic space. A transformation effect (which may be represented by a transfer function in some embodiments) related to the differences (e.g., amplitude, frequency, phase, etc.) between the calibration and measured signals is determined. The transformation effect and/or an inverse of the transformation effect are/is stored in a memory location. The device may be used to repeat the calibration process at various known locations within the acoustic space (e.g., at various distances, angular orientations, elevations, with respect to the acoustic interface, positioned near or distant from acoustic reflective surfaces and structures, etc.).

Thereafter, when in speech recognition mode, a user's position with respect to the acoustic interface is monitored and an inverse of the transformation effect associated with the user's position is utilized to improve the quality of a signal received from the user by the acoustic interface. The inverse transformation effect may be selected from stored inverse transformation effects (based upon the user's position with respect to the acoustic interface), or it may be determined when a speech signal is received at a specific location. In some embodiments, the inverse transformation effect is calculated (e.g., interpolated, extrapolated, etc.) based upon one or more stored inverse transformation effects and the user's position with respect to the acoustic interface. In some embodiments, the inverse transformation effect is implemented by utilizing convolution or deconvolution techniques, for example, as discussed below. In some embodiments, transformation effects may be represented by or modeled as a mathematical representation (such as for example a filter) that varies based upon the user's location within the room and the inverse transformation effect is represented by or modeled as an inverse of the mathematical representation (such as for example an inverse filter).

Determining signal location may be performed using a variety of techniques. In some embodiments, the techniques utilize signals provided from other devices present in the room and/or carried by a user.

Various aspects of the disclosure will now be described with regard to certain examples and embodiments, which are intended to illustrate but not to limit the disclosure.

FIG. 1A is a block diagram schematically illustrating an example of effects of a transformation and inverse transformation on a signal input. In some embodiments, a user's speech, a calibration signal (e.g., a chirp signal) and/or noise, etc. is provided by a user or calibration device as input $I_n$. The input $I_n$ 101*a* may undergo various transformations before it is received by an acoustic interface, especially if the acoustic interface is relatively far from the source. For example, the acoustic interface (and its receiver/microphone) may be located across a room from the speaking user or the calibration-signal-emitting device. The room can be of various types and/or sizes, such as a room in a house, an office, a front or back seat of a vehicle, and the like.

Transformations affecting the input $I_n$ 101*a* can include frequency attenuation of the input $I_n$ 101*a* (e.g., by virtue of the input travelling through air, etc.). The frequency attenuation may be relatively more pronounced at some frequencies. The transformations may also include echoes created by the sound waves of the speech or the calibration signal bouncing off the walls, the ceiling and/or the floor of the room. The transformations may also include other transformations of the input $I_n$ 101*a*. In some embodiments, these various transformations 102 may be modeled as a filter. In some embodiments, the filter includes a linear time variant or invariant filter.

The transformed version of input $I_n$ 101*a* may be represented as a signal $I_{n\_f}$ 101*b*. In some embodiments, the transformed input signal $I_{n\_f}$ 101*b* is received by an acoustic interface's microphone. To substantially undo the transformations affecting the input $I_n$ 101*a*, an inverse transformation 103 may be determined. In some embodiments, the inverse transformation 103 may be determined as an inverse of the filter modeling the transformation 102. The signal $I_{n\_f}$ 101*b* is received by the inverse transformation 103, which outputs an output signal $I_{n\_f\_if}$ 101*c*. The output signal $I_{n\_f\_if}$ 101*c* approximates the original input $I_n$ 101*a*. The output $I_{n\_f\_if}$ 101*c* may not be the exact same signal as the input $I_n$ 101*a* because of the presence of various additive noises in the room, aliasing, or other effects.

Figure 1B:
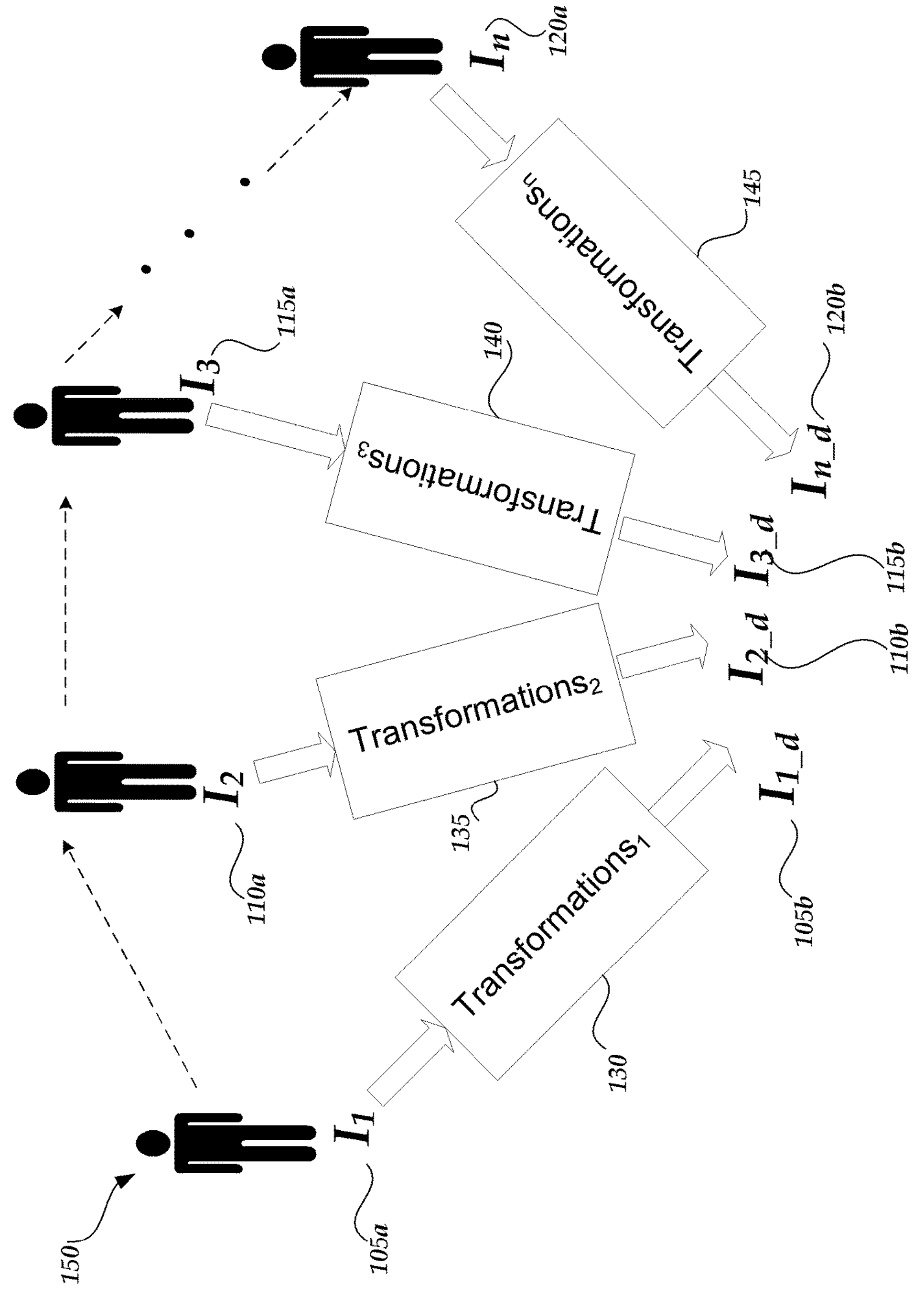
FIG. 1B is a block diagram schematically illustrating an example of transformations of speech input from various locations in a room.

FIG. 1B is a block diagram schematically illustrating an example of transformations of speech input from various locations in a room. As described above, a speech or calibration signal emitted at a distance from an acoustic interface's microphone will undergo various transformations. As illustrated in FIG. 1B, the transformations may further be based on the user's or calibration device's position in the room. A speaking user 150 is shown in FIG. 1B as the source of the input $I_n$; however, as described above, in some embodiments, the source includes a calibration signal emitting device. A speaking user (also referred to herein as user) 150 located at various locations in a room may emit a respective signal $I_1$ 105*a*, $I_2$ 110*a*, $I_3$ 115*a* . . . $I_n$ 120*a*, each corresponding to a particular sound, speech, command, etc. of the user. Each of these respective signals $I_1$ 105*a*, $I_2$ 110*a*, $I_3$ 115*a* . . . $I_n$ 120*a* undergoes a respective transformation (transformations$_1$, transformations$_2$, transformations$_3$ . . . transformations$_n$) that corresponds to the user's position within the room at the time the sound is generated. Therefore, depending on the position of the speaking user 150 in the room at the time the speech spoken, the resulting transformed signal at a given location in the room can be different. As shown, the resulting transformed signals may respectively be signals $I_{1\_d}$ 105*b*, $I_{2\_d}$ 110*b*, $I_{3\_d}$ 115*b* . . . $I_{n\_d}$ 120*b*.

Figure 1C:
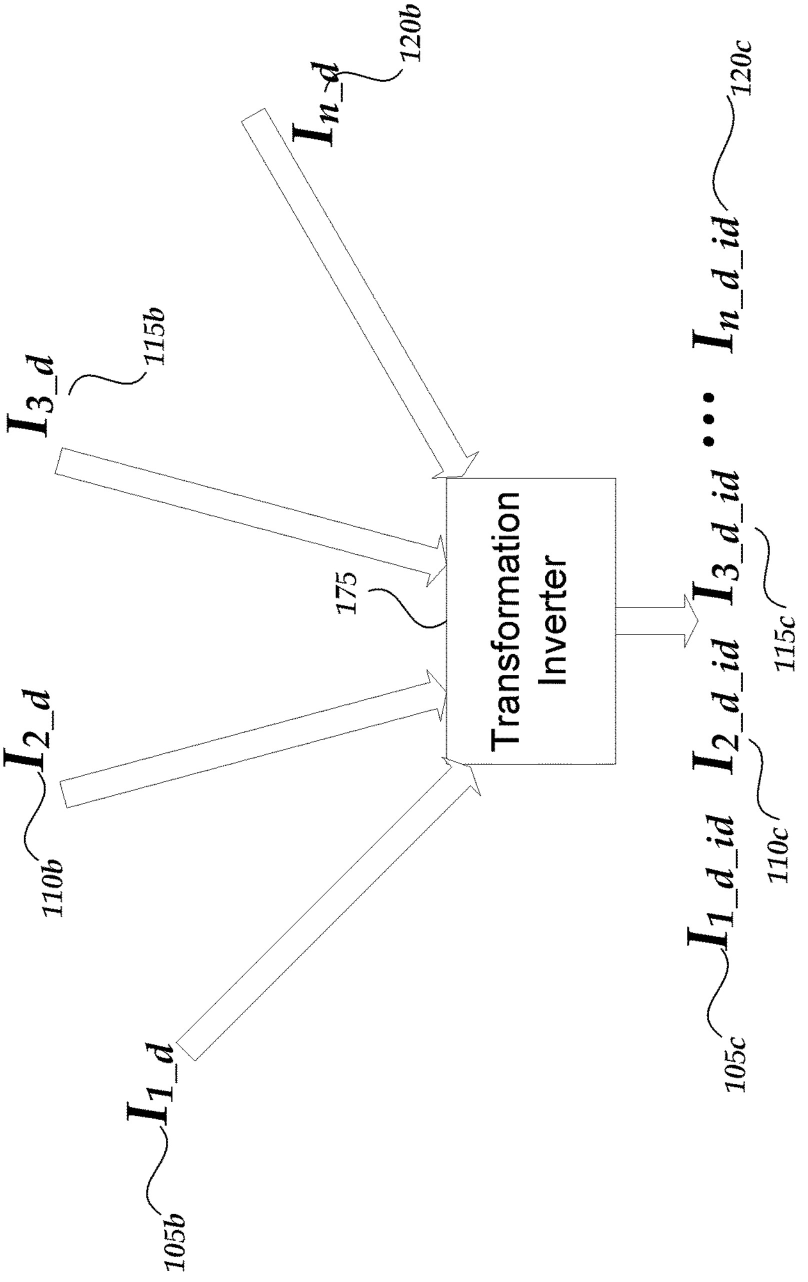
FIG. 1C is a block diagram schematically illustrating an example of inputs and outputs to a transformation inverter placed in a room.

The acoustic processor inverts the transformations to approximate the original source signals $I_1$ 105*a*, $I_2$ 110*a*, $I_3$ 115*a* . . . $I_n$ 120*a*. One such acoustic processor 175 (sometimes referred to herein as a transformation inverter or transformation inverting device) is illustrated in FIG. 1C. The transformation inverter 175 receives one or more of the transformed signals $I_{1\_d}$ 105*b*, $I_{2\_d}$ 110*b*, $I_{3\_d}$ 115*b* . . . $I_{n\_d}$ 120*b* and then produces one or more of the signals $I_{1\_d\_id}$ 105*c*, $I_{2\_d\_id}$ 110*c*, $I_{3\_d\_id}$ 115*c* . . . $I_{n\_d\_id}$ 120*c*, which are respective approximations of the original source signals $I_1$ 105*a*, $I_2$ 110*a*, $I_3$ 115*a* . . . $I_n$ 120*a*.

In various embodiments, more than one acoustic interface may be placed in the room. The acoustic interfaces may be placed relatively close to the location(s) where user's speech is most likely to occur (e.g., near the sofa, near the coffee table, at the doorway, etc). Other factors may also be used to determine the location of the acoustic interfaces in the room. For example, the interfaces may be placed away from walls in the room. In some embodiments, each of the interfaces is located to be beyond the near-field, or more than about 1 foot away from the user or device in the room. In other embodiments, each of the interfaces is located to be more than about 3 feet away from the user or device in the room. In yet other embodiments, each of the interfaces is located to be more than about 10 feet away from the user or device in the room.

The transformation inverting device 175 can include various electronic components, as will be described further below in association with FIG. 9. The transformation inverting device 175 may be used for recording audio which may then be processed for speech recognition, for example. The transformation inverting device 175 may have functionality of a speakerphone or other hands free device and could be used to execute, control and interact with various hardware and software applications. The transformation inverting device 175 may include a microphone, a microphone array, a camera and/or a camera array. In some embodiments, the transformation inverting device 175 is configured to perform various signal processing techniques and processes, such as for example, beam forming, localization and the like. The transformation inverting device 175 may also include one or more Wi-Fi, LAN, WAN, PAN and/or BLUETOOTH radios (e.g., IEEE 802.11x, etc.).

If more than one transformation inverting device 175 is placed in a room, the devices 175 may be strategically placed in relation to one another. For example, if there are two devices 175, these can be placed at opposing corners of a room. In some embodiments, the transformation inverter 175 may comprise a three-dimensional microphone array enabling the inverter 175 to perform three-dimensional beam forming.

As will be described below, the transformation inverter 175 may be first calibrated in order to create filters and/or other tools that model transformations affecting signals coming from speech spoken at various locations within a room or acoustic space. The transformation inverter 175 may also model or calculate an associated inverse, such as an inverse filter, for inverting the transformations. Once the transformation inverter 175 is calibrated, when a user emits a signal in the room, the transformation inverter 175 determines the location of the user in the room and selects the appropriate inverse filter to apply to the transformed signal, in order to approximate the signal likely emitted from the user. The presence of more than one such transformation inverting device 175 in the room allows for improvements in determining the location of the user and/or the approximation of the input signal, as will be described further below.

Figure 2:
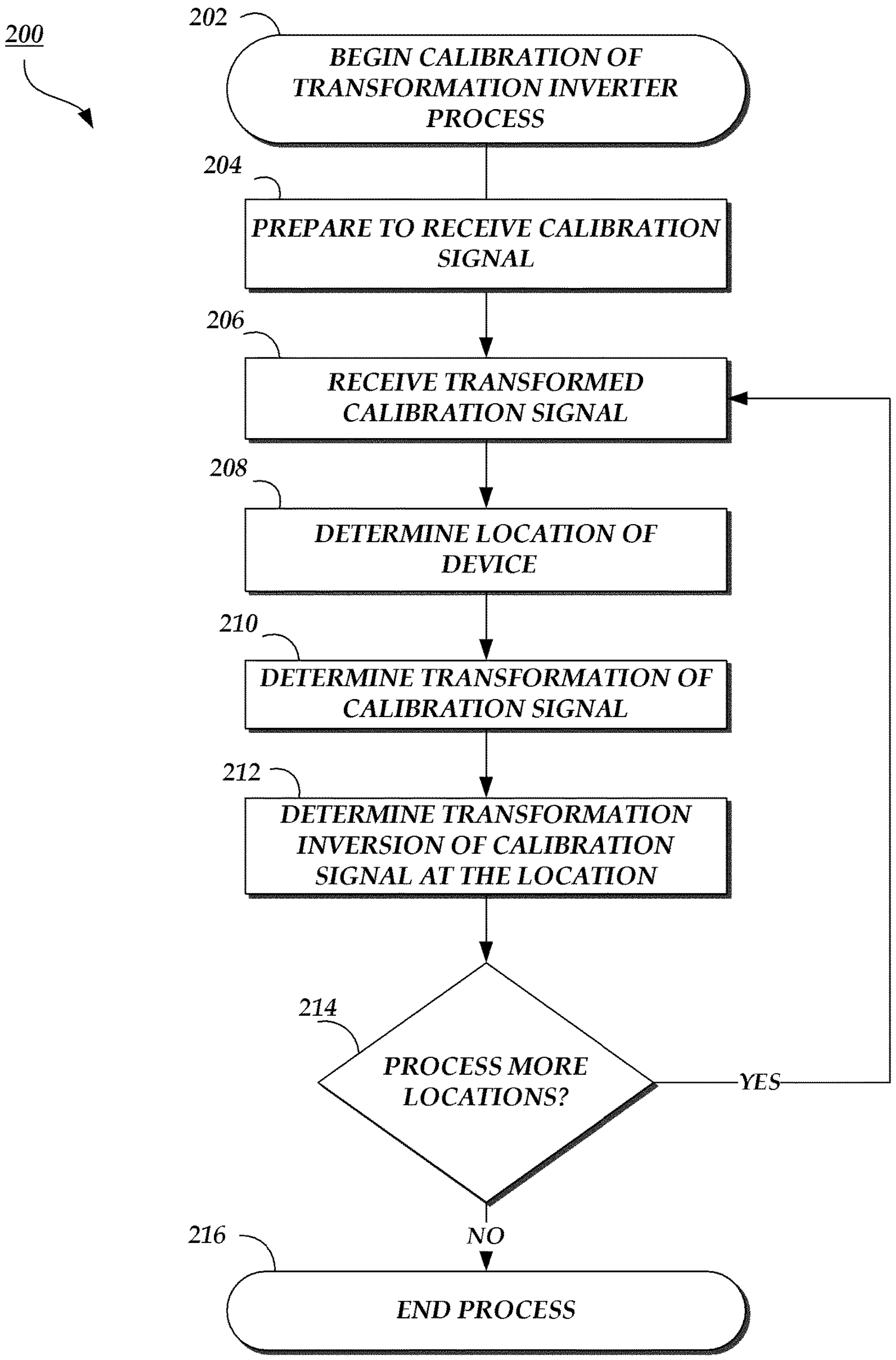
FIG. 2 is a flow diagram illustrating an embodiment of a calibration of transformation inverter routine.

FIG. 2 is a flow diagram illustrating an embodiment of a calibration of transformation inverter routine 200. In various embodiments, the routine 200 may be executed by the transformation inverter device 175. The routine 200 starts at block 202 and at block 204, the transformation inverter prepares to receive a calibration signal from a device. In some embodiments, a user may be instructed (for example, with written instructions provided with the inverter 175, or actively during the calibration process) to have a device emit a calibration sound, having known characteristics (e.g., frequencies, durations and/or amplitudes, etc.). The calibration sound may cover a wide range of frequencies of interest to speech. In some embodiments, the range of frequencies may be from about 300 Hz to about 22 kHz. In various embodiments, the calibration sound includes an impulse function or a chirp signal, or a sound with similar qualities. An impulse function may be very short in duration and very wide in frequency content. The chirp can include a signal in which the frequency increases or decreases with time. In some embodiments, the chirp signal may be generated by a device such as a mobile phone. The user controlling the device may be directed to face the transformation inverter 175 when emitting the calibration sound and to also minimize other noises in the room, if possible. At block 206, the calibration signal is received by the transformation inverter 175. In some embodiments, the user controlling the device may also be notified if the quality of the emitted sound is relatively low.

The routine 200 then proceeds to block 208, where the location of the device is determined. The techniques used to determine the location of the device are used both during the calibration and speech recognition modes. These techniques will be described below in relation to FIGS. 4, 5A, 5B, 6A and 6B.

Once the location of the device is determined, the routine 200 proceeds to block 210, where the transformation to the calibration signal is determined. Since the calibration signal is known, signal transformations can be determined by various mathematical techniques. For example, the transformations may be modeled as a filter (e.g., an impulse response or transfer function) corresponding to the determined location. In some embodiments, the filter function is determined by deconvolving the transformed and the untransformed calibration signals. In various embodiments, the deconvolution may be performed using linear deconvolution algorithms including inverse filtering and Wiener filtering. The deconvolution may also be performed using nonlinear algorithms including the CLEAN algorithm, maximum entropy method and LUCY, etc. In some embodiments, block 210 may be omitted and only the transformed and untransformed calibration signals may be stored during the calibration process for use during the speech recognition mode.

Then, at block 212, the inverse transformation is computed for that specific location using mathematical techniques. In some embodiments, the routine 200 performs blocks 210 and 212 as a single block, or it only performs one of blocks 210 and 212, or it does not perform blocks 210 and 212. In various embodiments, the determination of the appropriate inverse transformation may be done immediately following the determination of the transformation at block 210, or it may be done at a later time. For example, the transformation associated with a given location may be determined at block 210 during the calibration process and stored for later use, or the inverse transformation may be determined when a signal is received from that location during speech recognition, as described with respect to FIGS. 3A and 3B below.

For example, in some embodiments, the routine 200 receives a signal that corresponds to a predetermined, known calibration signal emitted at a known position with respect to an acoustic interface/processor, transformation inverter, microphone, or other signal receiver. An inverse transformation model is determined by processing the measured and calibration signals. For example, the inverse transformation model can be determined by deconvolving the measured and calibration signals.

Calibration may be repeated by the routine 200 at multiple locations in the room. Therefore, after block 212, the routine 200 proceeds to decision block 214, where it determines whether sufficient locations have been processed for the room. The determination of sufficient locations may be based on the likely positions a user may expect to be located in the room when the distortion inverter 175 is in speech recognition mode, the size of the room, the number of acoustic processors located in the room, etc. The determination of sufficient locations may also be based on an indication from the device that there are no more signals to be transmitted. The determination may alternatively be based on a predetermined number of locations. The determination may also be based on the variability of the various locations previously chosen by the user, as determined at block 208. Therefore, if it is determined that more locations should be processed, the routine 200 returns to block 206 and repeats blocks 206 through 210 or 212. The routine ends at block 216.

In some embodiments, the transformation inverter 175 may emit a known sound, or a ping signal, for example, to determine its approximate location in the room. For example, by using a built-in beam-former, the transformation inverter 175 may determine the location of nearest walls, ceiling and floor in various directions. Using this information, the transformation inverter 175 may direct the device for proper placement in the room at block 204, for example, including being placed away from corners or walls of the room. In various embodiments, the transformation inverter(s) 175 may placed at different heights away from the room floor.

In some embodiments, the transformation inverter 175 may also include sensors, gyroscopes and/or accelerometers to help determine when the transformation inverter 175 is moved within the room. If the transformation inverter 175 has moved, the transformations and inverse transformations may be re-calibrated using the calibration of transformation inverter routine 200. In some embodiments, transformation inverter may be able to determine the direction and distance of its displacement and update its existing transformations and inverse transformations accordingly without recalibration.

In embodiments where more than one transformation inverter 175 is used in a room, the respective transformation inverters 175 may be used as sources of known calibration signals in order to calibrate other transformation inverters 175 in the room. In some embodiments, when a transformation inverter 175 is added to a room with an existing transformation inverter 175, the newly added transformation inverter 175 may be detected by the existing transformation inverter 175. For example, the new transformation inverter 175 may transmit a signal detectable by the existing transformation inverter 175. The previously existing transformation inverter 175 may direct the device in the room to calibrate the new transformation inverter 175.

Once the one or more transformation inverters 175 in a room have been calibrated at a sufficient number of locations, they can be used to receive signals (e.g., speech commands, etc.) and to approximate the transmitted (e.g., spoken, etc.) signals by applying the inverse filter determined for the likely location of the source of the transmitted signals. An example of the use of the transformation inverter(s) 175 in speech recognition mode is illustrated in FIGS. 3A and 3B, which are flow diagrams illustrating embodiments of transformation inversion routines.

Figure 3A:
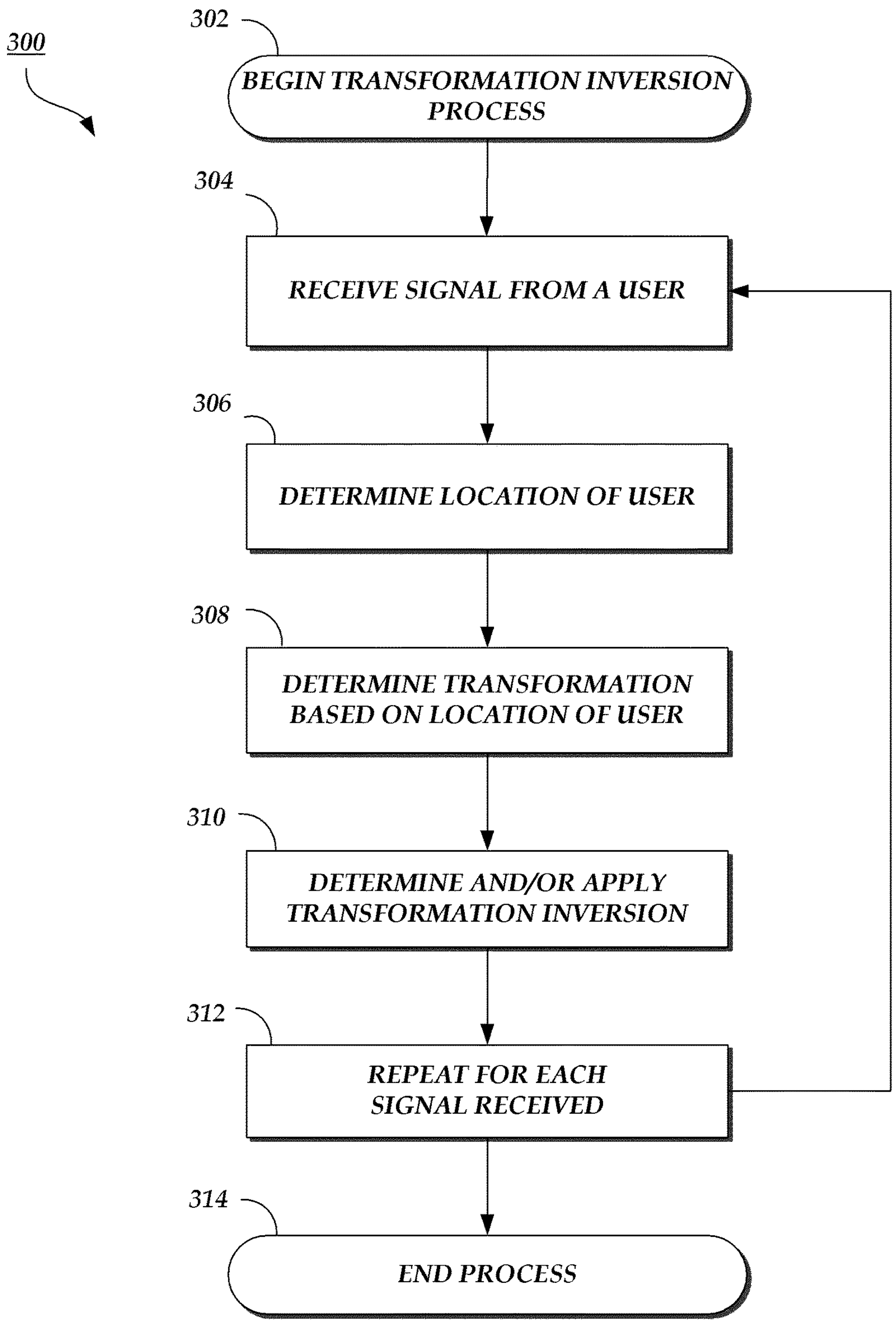
FIGS. 3A and 3B are flow diagrams illustrating embodiments of transformation inversion routines.
Figure 3B:
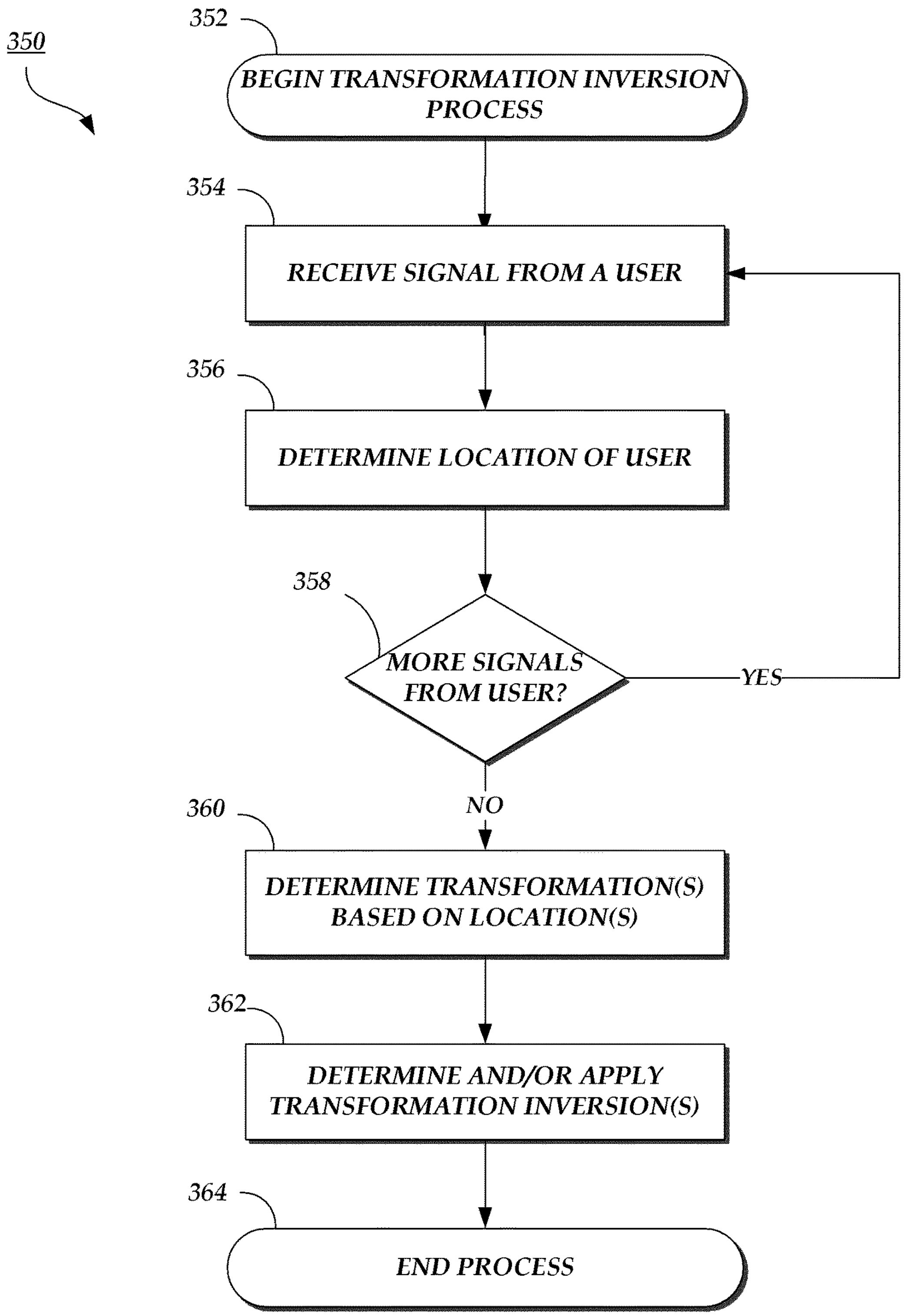

In the embodiment of FIG. 3A, the routine 300 starts at block 302. At block 304, a signal is received from a user in the room. The routine 300 then proceeds to block 306, where the location of the user is determined. The techniques used to determine the location of the user are used both during the calibration and speech recognition modes of the transformation inverter 175. These techniques will be described below in relation to FIGS. 4, 5A, 5B, 6A and 6B.

Once the location of the user is determined, the routine 300 proceeds to block 308. The measured, received signal may be considered to be a convolution of the transmitted signal and a filter response (e.g., an impulse response) in the time domain, or the product of the transmitted signal and a filter response (e.g., a transfer function) in the frequency domain. At block 308, the filter response is determined, for example, retrieved from a memory location (as stored at block 210), based upon the user's location. In some situations, the determined location of the user may not have a previously determined filter response associated with it. In such situations, interpolation or extrapolation techniques may be used to determine an estimate of the filter response for the determined location based on the filter responses determined for locations proximate to the determined location. In some embodiments, the filter response may not have been determined at block 210 and the inverse filter response may be determined at block 208 using the stored transformed and untransformed calibration signals, and the received signal.

An approximation of the transmitted signal can be obtained by deconvolving a measured, received signal with the previously-determined filter response corresponding to the user's location. In various embodiments, the deconvolution may be performed using linear deconvolution algorithms including for example inverse filtering. In other embodiments, the linear deconvolution algorithm may include Wiener filtering. The deconvolution may also be performed using nonlinear algorithms such as for example the CLEAN algorithm, maximum entropy method, LUCY, and the like.

Then, at block 310, the transformation is inverted, reduced and/or removed, for example, by applying the appropriate inverse transformation, such as for example an inverse filter determined for that location. For example, transformation may be removed from measured signals by deconvolving the measured signal and filter response determined at block 308. As described in conjunction with FIG. 2 above, the inverse of the transformation associated with the location as determined at block 308 may be determined during the calibration process and applied at block 310, or, alternatively, may be determined at block 310, during the use of the transformation inverter(s) 175 in the speech recognition mode and thereafter applied. In embodiments where the inverse transformation is determined at block 310, the inverse may be determined in the following ways. In some embodiments, the inverse transformation may be determined by using the known signal received during the calibration process and the measured transformed signal received during the calibration process for that location. In other embodiments, the inverse transformation may be determined by using the signal received during use of the transformation inverter(s) and the measured transformed signal received during the calibration process for that location.

Then, at block 312, the routine 300 repeats blocks 304 through 310 for each new signal received, if there are more signals received. The routine 300 ends at block 314.

In the embodiment of FIG. 3B, the user may be moving while transmitting a signal (e.g., speaking) to the transformation inverter(s) 175 in the room. Similar to the embodiment of FIG. 3A, the routine 350 starts at block 352, and at block 354, a signal is received from the user in the room. The routine 350 then moves to block 356, where the location of the user is determined. The techniques used to determine the location of the user or device are used both during the calibration and the speech recognition modes of the transformation inverter 175. These techniques will be described below in relation to FIGS. 4, 5A, 5B, 6A and 6B.

Once the location of the user is determined, the routine 350 moves to decision block 358 and determines whether the user is still transmitting a signal. If it is determined at decision block 358 that the user is still transmitting a signal, the routine 350 returns to block 354 and repeats blocks 354 and 356 as long as the user is still transmitting a signal.

If it is determined at decision block 358 that the user is no longer transmitting a signal, the routine 350 moves to block 360 where the filter responses are determined to be the transformations previously determined for the respective determined locations of the user.

Then, at block 362, an approximation of the transmitted signal is obtained by performing a deconvolution of the received signal and the filter response. As described in conjunction with FIG. 2 above, the inverse of the transformation associated with the location as determined at block 356 may be determined during the calibration process and applied at block 362, or, alternatively, may be determined at block 362, during the use of the transformation inverter(s) 175 in speech recognition mode and thereafter applied. In embodiments where the inverse transformation is determined at block 362, the inverse may be determined in the following ways. In some embodiments, the inverse transformation may be determined by using the known signal received during the calibration process and the measured transformed signal received during the calibration process for that location. In other embodiments, the inverse transformation may be determined by using the signal received during use of the transformation inverter(s) in speech recognition mode and the measured transformed signal received during the calibration process for that location. The transformation may be inverted by applying an average of the filter responses determined for the various locations of the user, or by applying each transformation filter to a corresponding portion of the received signal determined by the location of the user when the portion of the received signal was received. The routine 350 ends at block 364.

As described above, the transformation inverter(s) 175 can determine the user or device's location during calibration and subsequent speech recognition modes. In some embodiments, the transformation inverter device(s) 175 may use a beam forming microphone and the microphone alone can be used to determine location of the user or device. Some other techniques which can also be used to determine the location are described below with reference to FIGS. 4, 5A, 5B, 6A and 6B. In some embodiments, other sensors present in the room or on the user or device may be used in conjunction with or instead of the techniques described below to determine the location of a transmitted signal. For example, GPS capability available on a mobile phone may be used. In another example, a Wi-Fi router may be used to determine distances and locations between the router, the signal source and the transformation inverter(s) 175 in the room. In yet another example, the transformation inverter 175 may send a ping signal in a room without a user or device present and thereby determine a possible configuration of the room based on the reflected waves and then use another ping signal when a user or device is present to determine a possible location of the user or device. In some other embodiments, the location can be determined using a combination of the variety of the different techniques.

As used herein, the determination of the location of the signal source may include a determination of the angle and the distance between the source (e.g., the user or device) and the respective transformation inverter device 175. In some embodiments, an arbitrary reference zero angle may be determined for the transformation inverter device 175 and depending on the determined distance and direction of the input signal around the device, the angle may be determined. In some embodiments, the location may be defined by polar coordinates.

Figure 4:
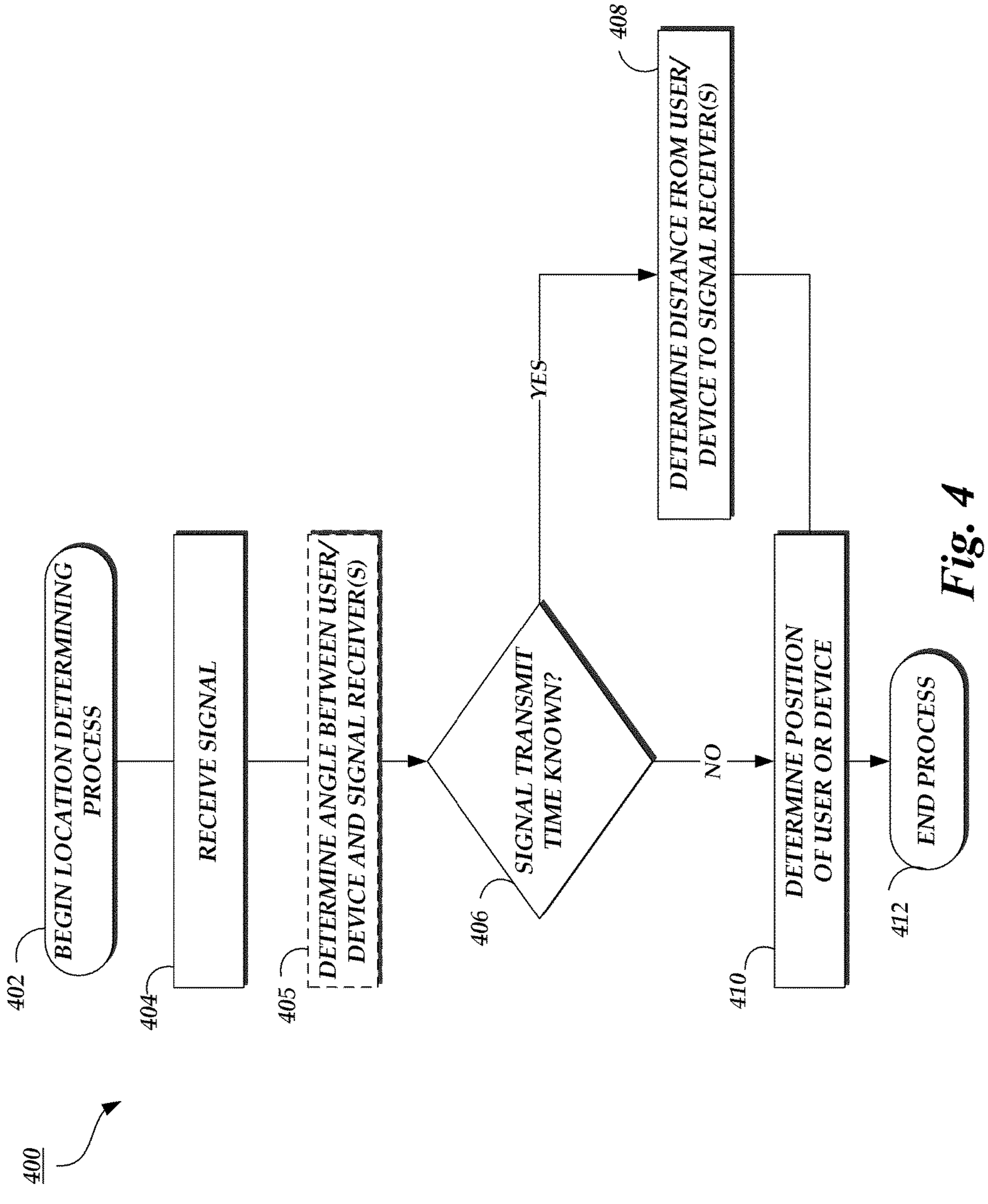
FIG. 4 is a flow diagram illustrating an embodiment of a location determination routine.

FIG. 4 is a flow diagram illustrating an embodiment of a location determination routine 400. In various embodiments, the routine 400 may be executed by one or more of the transformation inverter device(s) 175. In some embodiments, the location determination techniques can be used to determine distances between a device/user and one or more transformation inverters 175 and/or the distances between multiple transformation inverters 175. The location determination routine 400 starts at block 402 and proceeds to block 404 when a signal is received by the one or more transformation inverter device(s) 175. The signal received at the transformation inverter(s) 175 may include an associated time stamp that indicates the time the signal was received. Once the signal is received, the routine 400 may optionally proceed to block 405, where the angle between the user or device and the transformation inverter(s) 175 is determined. In some embodiments, the transformation inverter(s) 175 may be equipped with microphone arrays and the arrays may be used to determine the angle(s) associated with the signals received. In a microphone array, the signal received at each one of the microphones has a different receive time associated with it. Using the various receive times, the angle of the signal may be determined.

In some embodiments, each transformation inverter device 175 may have its own acoustic interface. In such embodiments, the transformation inverter device 175 and the acoustic interface are combined and a distance and/or angle may be computed between the transformation inverter device 175 and the user/device. In some embodiments, a transformation inverter device 175 may be connected to one or more acoustic interfaces. In this embodiment, the distances and angles may be computed relative to the acoustic interfaces connected to the transformation inverter device instead of relative to the transformation inverter device 175 itself. For simplicity in the following description, each transformation inverter device 175 will have its own acoustic interface, but the routines may also be performed by a transformation inverter device 175 with multiple acoustic interfaces.

Then, the routine 400 proceeds to decision block 406 where it is determined whether the transmit time of the signal is also known.

As described above, during the calibration of the transformation inverter(s) 175, a calibration sound, such as a chirp signal for example, may be emitted from a device such as a mobile phone, for example. In such situations, the transmit time of the signal may be known if the signal generating device (e.g., a mobile phone, etc.) sends the transmit time of the signal to the one or more transformation inverter(s) 175, e.g., via Wi-Fi or Bluetooth. The transmit time may also be known if the mobile phone simply sends a Wi-Fi signal to the transformation inverter(s) instead of, or in addition to a chirp signal. In some embodiments, the signal generating device is synchronized with the transformation inverter(s) 175 and in some embodiments, it is not synchronized with the transformation inverter(s) 175.

If the transmit time of the signal is known, then the routine 400 proceeds to block 408 to determine the distance between the source of the signal and the transformation inverter(s) 175. For example, if the signal generating device and the transformation inverter are synchronized, the routine 400 uses the difference between the transmit and receive times of the signal to estimate distance between the signal generating device and the transformation inverter. If the signal generating device and the transformation inverter 175 are not synchronized, the routine 400 may use other techniques to estimate the distance. For example, the transformation inverter could emit an audio signal to trigger the signal generating device to emit the calibration signal and the distance may be estimated using the round trip transit time. In some embodiments, both the chirp signal and the Wi-Fi signal may be used together to get a better approximation of the distance. By combining distance estimates based on different techniques, a more accurate estimate of the location of the user or device may be obtained. If the transmit time of the signal is not known, such as for example if the transformation inverter device(s) 175 are not synchronized with a device carried by the user, the routine 400 moves to block 410 to determine the position of the user or device in the room The position of the user or device in the room at block 410 is determined differently depending on the availability of a determined angle at optional block 405, determined distance at block 408 (if any) and also based on the number of transformation inverting device(s) 175 available in the room. Some examples of different scenarios are described below in conjunction with FIGS. 5A, 5B and 6A, 6B. FIGS. 5A-5B and 6A-6B are block diagrams schematically illustrating different embodiments of techniques of determining positions of users or devices in a room.

Two or More Distortion Inverters 175, Distance Determined at Block 408

Figure 5A:
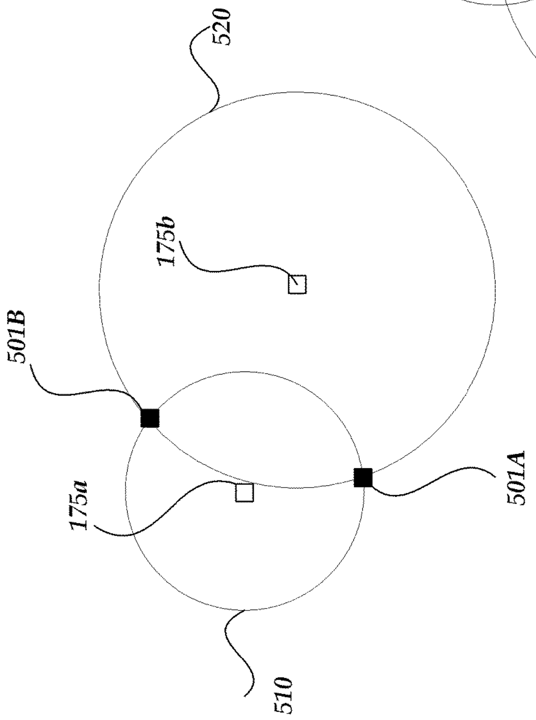
FIGS. 5A and 5B are block diagrams schematically illustrating embodiments of techniques of determining positions of users or devices in a room.

In various embodiments, there may be more than one transformation inverter 175 placed in the acoustic space. In such embodiments, the transformation inverters 175 may be synchronized with one another such that they are set to substantially the same clock. Therefore, a signal received at each transformation inverter would have a respective receive time for each transformation inverter. The difference between the receive times between the transformation inverters can be used to determine the distance from the user or device to each of the transformation inverters. In addition, the transformation inverters 175 may also be synchronized with the device emitting the calibration signal. In such a scenario, the distance between the transformation inverter(s) and the calibration signal emitting device can be known. With reference to FIG. 5A, if there are two transformation inverters **175*a* and 175*b*, then based on the computed distances from each of the transformation inverters 175*a* and 175*b* and the signal source, respective circles 510 and 520 can be drawn around each of the transformation inverters 175*a* and 175*b*. The points of intersection 501A and 501B on the two circles represent the possible positions of the signal source. Then, using other sensors and/or techniques, such as beam forming capabilities of the transformation inverters 175*a* and 175*b*, the correct one from among 501A and 501B can be determined as the position of the signal source. In some embodiments, if the transformation inverters 175*a* and 175*b* do not have beam forming capabilities, then the two locations may be used. In some embodiments, the transformation inversion selected at block 310 in FIG. 3** may comprise an average of the respective inverse filters previously determined for those two locations. In some embodiments, the average may include a weighted average of the inverse filters. In other embodiments, instead of averaging the inverse filters, two estimates of the input signal may be determined using the two location estimates and then the two estimates may be combined or averaged.

Figure 5B:
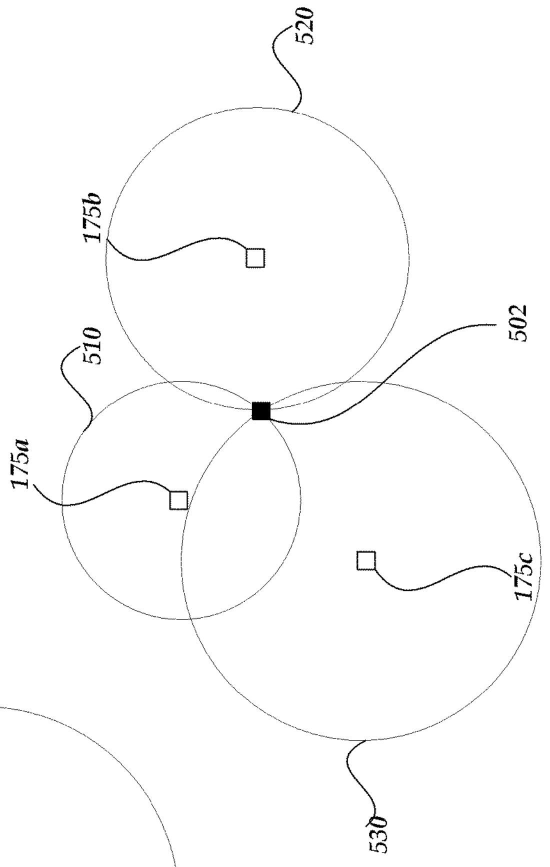

With reference to FIG. 5B, if there are three transformation inverters 175*a*, 175*b* and 175*c* in the room, then the intersection of the three circles 510, 520 and 530 can be used to determine the position 502 of the signal source. Using other sensors and/or techniques, such as beam forming capabilities of the transformation inverters 175*a*, 175*b* and 175*c*, the position 502 may be further refined.

Two or More Transformation Inverters 175, Distance not Determinable at Block 408

In other embodiments, there may be more than one transformation inverter 175 placed in the acoustic space. In such embodiments, the transformation inverters 175 may be synchronized with one another such that they are set to substantially the same clock. Therefore, a signal received at each transformation inverter would have a respective receive time for each transformation inverter. The transformation inverters 175 however may not be synchronized with a user emitting the speech signal. In such a scenario, the distance between the transformation inverter(s) and the speech signal source may not be known. However, the difference between the receive times of the transformation inverters 175 can be used to determine the distance from the user to each of the transformation inverters 175. With reference to FIG. 6A, if there are two transformation inverters 175*a* and 175*b* and the distance between them is known, then based on the difference between received times of the signal at each of the transformation inverters 175*a* and 175*b*, respective hyperbolas 610 and 620 can be drawn around each of the transformation inverters 175*a* and 175*b*. The points of intersection 601A and 601B on the two hyperbolas represent the possible positions of the signal source. Then, using other sensors and/or techniques, such as beam forming capabilities of the transformation inverters 175 and 175*b*, the correct one from among 601A and 601B can be determined as the position of the signal source. In some embodiments, if the transformation inverters 175*a* and 175*b* do not have beam forming capabilities, then the two locations may be used and the transformation inversion selected at block 310 in FIG. 3 may comprise an average of the respective inverse filters previously determined for those two locations. In some embodiments, the average may include a weighted average of the inverse filters. In other embodiments, instead of averaging the inverse filters, two estimates of the input signal may be determined using the two location estimates and then the two estimates may be combined or averaged.

Figure 6B:
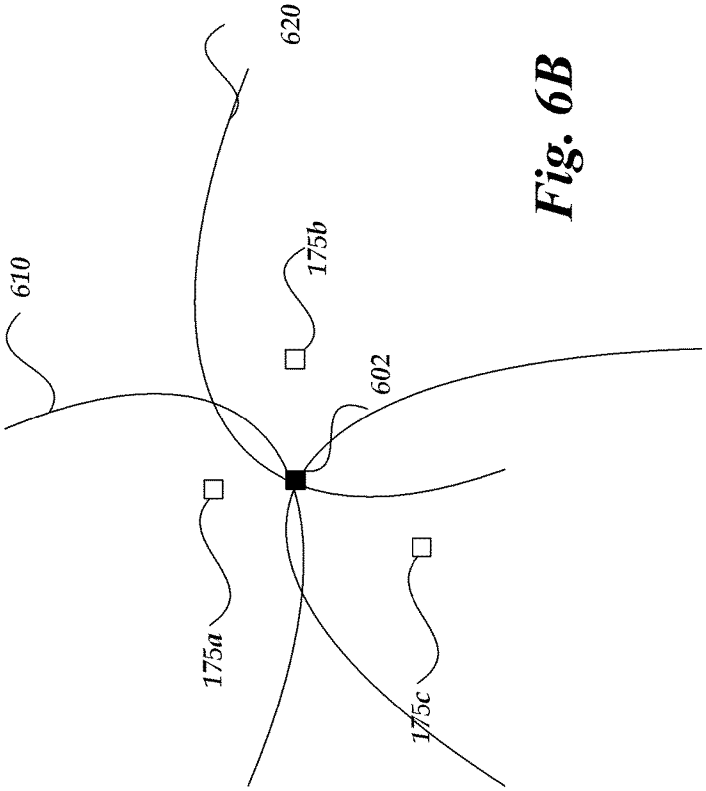
FIGS. 6A and 6B are block diagrams schematically illustrating other embodiments of techniques of determining positions of users or devices in a room.
Figure 6A:
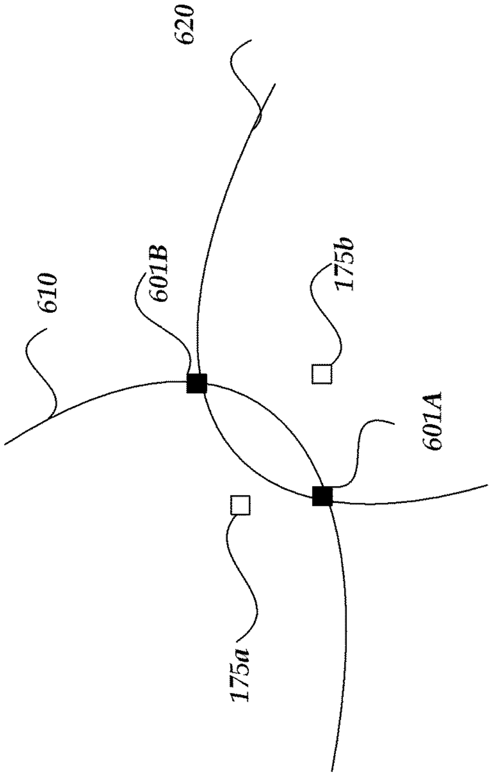

With reference to FIG. 6B, if there are three transformation inverters 175*a*, 175*b* and 175*c* in the room, then the intersection of the three hyperbolas 610, 620 and 630 can be used to determine the position of the signal source.

One Transformation Inverter 175, Distance Determined at Block 408, Angle Determined at Block 405

If the distance and angle between the transformation inverter 175 and the source of the signal is known, then the possible locations of the user or device may be represented by a circle drawn around the transformation inverter 175. Then, the transformation inverter's 175 beam forming capabilities may be used to determine the location 602 of the signal source on the circle.

One Transformation Inverter 175, Distance Determined at Block 408, Angle not Determined at Block 405

If only the distance between the transformation inverter 175 and the source of the signal is known, but the angle is not known, then the average for all angles at that particular distance may be used as an estimate for the angle. Using the estimate for the angle and the determined distance, the possible locations of the user or device may be represented by a circle drawn around the transformation inverter 175.

One Transformation Inverter 175, Distance not Determinable at Block 408, Angle Determined at Block 405

In this situation, the only information available may be the angle of the signal source in relation to the transformation inverter 175. In various embodiments, if a good angle estimate is available, but a good distance estimate is not available, an average distance, room dimension, or a stored value corresponding to the angle can be used as an estimate of the location.

Execution Environment

Figure 7:
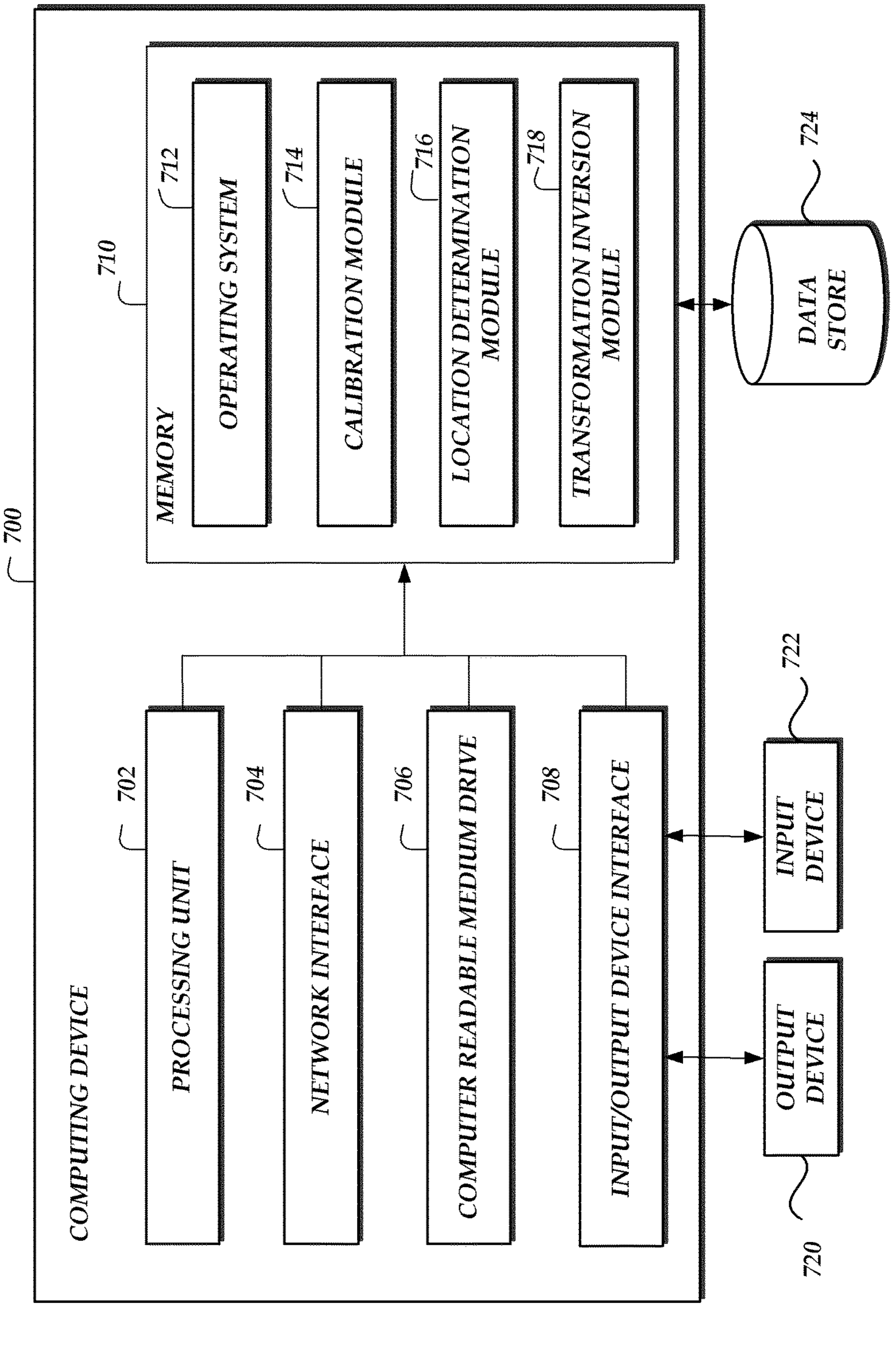
FIG. 7 is block diagram of an illustrative computing device configured to execute some or all of the processes and embodiments described herein.

FIG. 7 illustrates one embodiment of a computing device 700 configured to execute the processes and implement the features executed by a transformation inverter, such as transformation inverter 175 described above. The computing device 700 can be a server or other computing device and can comprise a processing unit 702, a network interface 704, a computer readable medium drive 706, an input/output device interface 708 and a memory 710. The network interface 704 can provide connectivity to one or more networks or computing systems. The processing unit 702 can receive information and instructions from other computing systems or services via the network interface 704. The network interface 704 can also store data directly to memory 710. The processing unit 702 can communicate to and from memory 710 and output information to an optional output device 718, such as a speaker, a display, and the like, via the input/output device interface 708. The input/output device interface 708 can also accept input from the optional input device 722, such as a keyboard, mouse, digital pen, microphone, camera, etc. In some embodiments, the output device 720 and/or the input device 722 may be incorporated into the computing device 700. Additionally, the input/output device interface 708 may include other components including various drivers, amplifier, preamplifier, front-end processor for speech, analog to digital converter, digital to analog converter, etc.

The memory 710 contains computer program instructions that the processing unit 702 executes in order to implement one or more embodiments. The memory 710 generally includes RAM, ROM and/or other persistent, non-transitory computer-readable media. The memory 710 can store an operating system 712 that provides computer program instructions for use by the processing unit 702 in the general administration and operation of the computing device 700. The memory 710 can further include computer program instructions and other information for implementing aspects of the present disclosure. For example, in one embodiment, the memory 710 includes a calibration module 714 that calibrates the transformation inverter(s) 175 in a room. In addition to the calibration module 714, the memory 710 can include a location determination module 716 and a transformation inversion module 718 that can be executed by the processing unit 702. Memory 710 may also include or communicate with one or more auxiliary data stores, such as data store 724. Data store 724 may electronically store data regarding determined filters and inverse filters at various locations in a room.

In operation, the computing device 700 loads the calibration module 714, the location determination module 716 and the transformation inversion module 718 from the computer readable medium drive 706 or some other non-volatile storage unit into memory 710. Based on the instructions of the calibration module 714, the location determination module 716 and the transformation inversion module 718, the processing unit 702 can load data from the data store 724 into memory 710, perform calculations on the loaded data or on data input from the input device 722 and store the results of the calculations in the data store 724.

In some embodiments, the computing device 700 may include additional or fewer components than are shown in FIG. 7. For example, a computing device 700 may include more than one processing unit 702 and computer readable medium drive 706. In another example, the computing device 700 may not include be coupled to an output device 720 or an input device 722. In some embodiments, two or more computing devices 700 may together form a computer system for executing features of the present disclosure.

Figure 8:
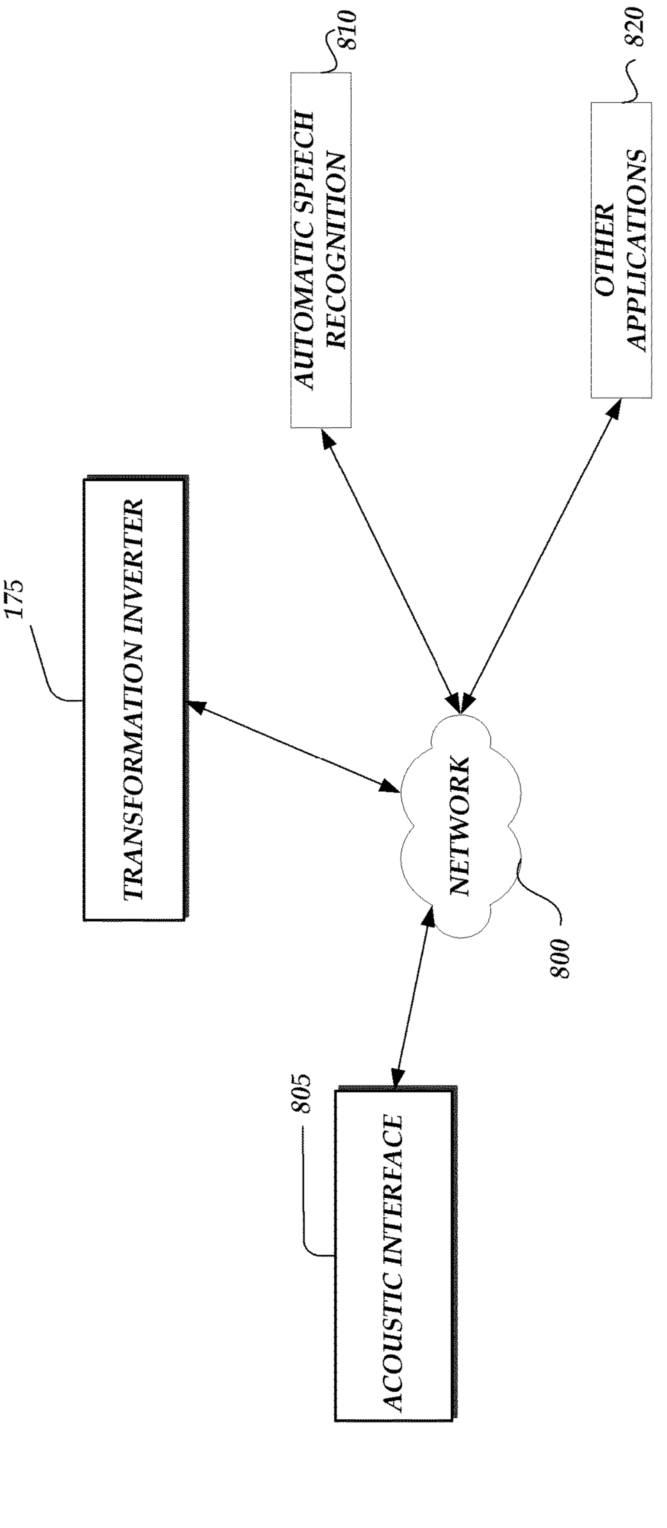
FIG. 8 is block diagram of an illustrative environment in which the transformation inverter is in communication with various applications.

FIG. 8 is block diagram of an illustrative environment in which an acoustic interface 805 is in communication with various applications. In some embodiments, the acoustic interface 805 may include a microphone which transmits signals received to a processor on a device or server located on a network connected to the acoustic interface. In some embodiments, the signals received by the acoustic interface 805 may be processed by a transformation inverter 175 located in the same acoustic space as the acoustic interface 805. In other embodiments, the signals received by the acoustic interface 805 may be sent across a network 800 to a remote transformation inverter 175. In some embodiments, the processed signals may be sent to an automatic speech recognition (ASR) application 810 across the network 800. In other embodiments, the processed signals may be used for audio recordings, or to be used for various other applications 820, including telecommunications, including for example for hands-free telephone communications, conferencing applications, and the like. The processed signals may also be used for controlling media devices such as televisions or communication devices such as telephones located in the same acoustic space as the acoustic interface 805, but located at a distance further than a near-field.

Terminology

Depending on the embodiment, certain acts, events, or functions of any of the processes or algorithms described herein can be performed in a different sequence, can be added, merged, or left out all together (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A non-transitory, computer-readable medium having computer-executable instruction sets, the computer-executable instruction sets comprising:

a signal receiving instruction set configured to cause a computing system to receive a transformed calibration signal generated by a microphone that converted a sound wave, wherein the transformed calibration signal corresponds to a transformation of a predetermined calibration signal, the predetermined calibration signal comprising acoustic information;

a location determination instruction set configured to cause the computing system to determine a location of an emitting device that emits audio output corresponding to the predetermined calibration signal;

a transformation estimation instruction set configured to cause the computing system to estimate a first inverse transformation using the transformed calibration signal and information about the predetermined calibration signal;

an information storing instruction set configured to cause the computing system to store information about the first inverse transformation and information about the location of the emitting device;

the signal receiving instruction set configured to cause the computing system to receive a transformed speech signal generated by the microphone, wherein the transformed speech signal corresponds to an utterance spoken by a user;

the location determination instruction set configured to cause the computing system to determine a location of the user based on the speech signal spoken by the user;

a transformation selection instruction set configured to cause the computing system to select a second inverse transformation, stored in advance by the information estimation set, based on the location of the user; and a signal estimation instruction set configured to cause the computing system to apply the second inverse transformation to the transformed speech signal.

2. The non-transitory, computer-readable medium of claim 1, wherein the first inverse transformation is an approximation of an exact inverse transformation and wherein the first inverse transformation is estimated using a Wiener filter.

3. The non-transitory, computer-readable medium of claim 1, wherein the second inverse transformation is the first inverse transformation.

4. The non-transitory, computer-readable medium of claim 1, wherein the location determination instruction set is further configured to determine at least one of an angle and a distance between the emitting device and the microphone.

5. A computer-implemented method comprising:

receiving a predetermined calibration signal, the predetermined calibration signal comprising acoustic information;

estimating a first transformation using the predetermined calibration signal;

adding the first transformation to a plurality of predetermined transformations;

receiving, at a microphone, a transformed signal from a source;

determining a location associated with the source based on the transformed signal;

selecting a previously-stored transformation corresponding to the location of the source from the plurality of predetermined transformations, wherein each transformation of the plurality of predetermined transformations corresponds to a respective location; and estimating a signal based upon the previously-stored transformation and the transformed signal.

6. The computer-implemented method of claim 5, wherein the previously-stored transformation is an approximation of an exact inverse transformation.

7. The computer-implemented method of claim 5, further comprising performing speech recognition with the estimated signal.

8. The computer-implemented method of claim 5, wherein determining the location associated with the source comprises utilizing a beam forming technique.

9. The computer-implemented method of claim 5, wherein determining the location associated with the source comprises processing signals other than the transformed signal.

10. The computer-implemented method of claim 9, wherein the signals other than the transformed signal comprise one or more of a Wi-Fi signal, a Bluetooth signal, or a GPS signal.

11. The computer-implemented method of claim 5, wherein determining a location comprises determining an angle and distance between the microphone and the source.

12. The computer-implemented method of claim 5, wherein estimating the signal comprises performing a convolution of the transformed signal and the previously-stored transformation.

13. An apparatus comprising:

a microphone configured to generate:

a transformed calibration signal, wherein the transformed calibration signal comprises a transformation of a predetermined calibration signal, the predetermined calibration signal comprising acoustic information; and a transformed speech signal, wherein the transformed speech signal corresponds to an utterance spoken by a user; and a processor in communication with the microphone configured to:

determine a location associated with a device that emits audio output corresponding to the predetermined calibration signal;

determine a location associated with the user based at least partly on the transformed speech signal;

apply a previously-stored transformation to the transformed speech signal using the location associated with the device, the location associated with the user, the transformed calibration signal, and information about the predetermined calibration signal.

14. The apparatus of claim 13, wherein the processor is configured to determine the location associated with the device by determining at least one of an angle and a distance between the microphone and the device.

15. The apparatus of claim 13, wherein the processor is configured to apply the transformation by applying a filter.

16. The apparatus of claim 13 further comprising a receiver configured to receive an indication of a transmit time of the predetermined calibration signal.

17. The apparatus of claim 16, wherein the processor is further configured to determine a distance from the device to the microphone based upon the indication of the predetermined calibration signal transmit time.

18. The apparatus of claim 13, further comprising:

a second microphone in communication with the processor, configured to generate:

a second transformed speech signal, wherein the second transformed speech signal corresponds to the utterance spoken by the user; and wherein the processor is configured to determine the location associated with the user by comparing a first receive time of the transformed speech signal with a second receive time of the second transformed speech signal.

19. The apparatus of claim 13, wherein the processor is further configured to estimate the transformation of the predetermined calibration signal based upon the received transformed calibration signal and information about the predetermined calibration signal.

* * * * *